INVENTOR.
NORMAN PETERSON
BY
ATTORNEY

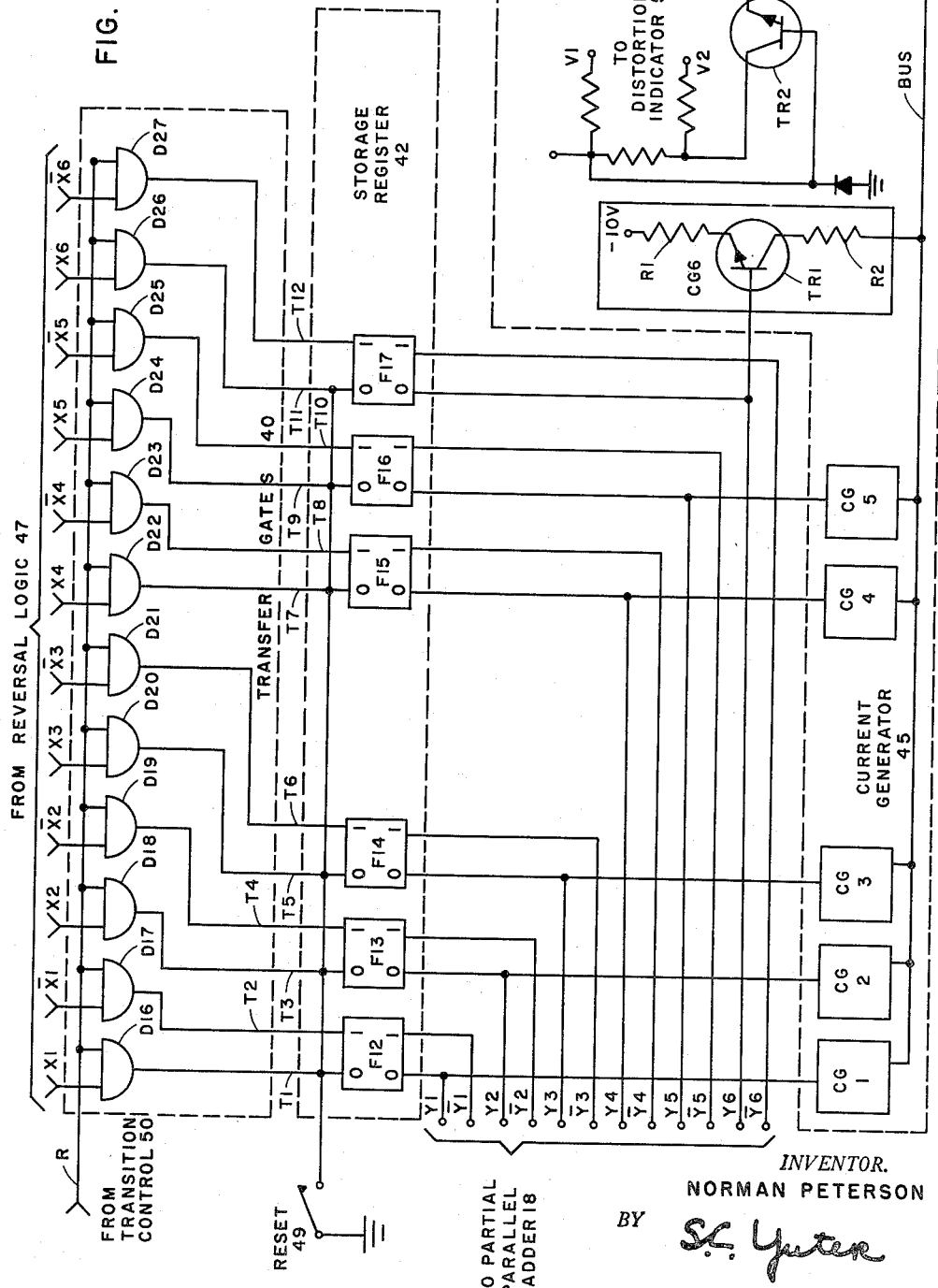

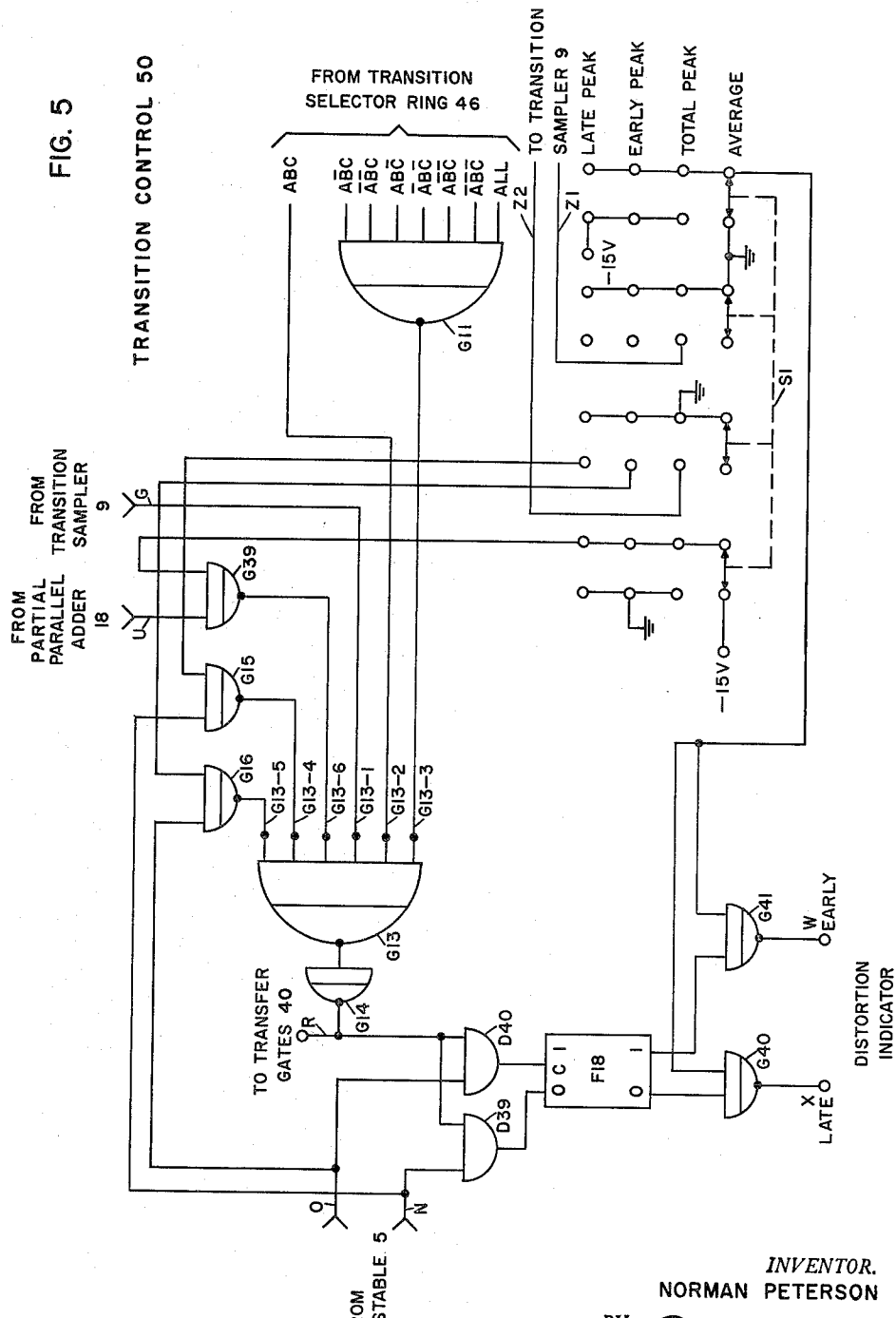

United States Patent Office 3,025,349
Patented Mar. 13, 1962

3,025,349
COMMUNICATIONS MONITORING SYSTEM
Norman E. Peterson, Norwalk, Conn., assignor to Stelma, Incorporated, Stamford, Conn., a corporation of Connecticut
Filed Aug. 24, 1960, Ser. No. 51,703
29 Claims. (Cl. 178—69)

This application is a continuation-in-part of copending application Serial Number 835,535, filed August 24, 1959 for Norman E. Peterson.

Telegraph transmitters usually transmit along a line one of two values of current called marks and spaces. In general, each character is represented by a binary coded combination of marks and spaces called bauds. Generally five bauds of equal duration are employed to represent a character. Bracketing these five bauds is a start space at the beginning of the character and a stop mark at the end of the character. As a result of transmitting the bauds along a line, the mark to space or space to mark transitions associated with the bauds are no longer sharp and instead of the bauds being rectangular pulses they become shaped. The effect of this shaping causes the mark to space or space to mark transitions of the bauds to occur at times different from the desired time. This is known as bias distortion.

It is accordingly a general object of the invention to provide apparatus for measuring distortion in pulses.

It is another object of the invention is provide apparatus which can measure bias distortion in telegraph systems.

It is a further object of the invention to provide apparatus for measuring distortion in selected pulses of a plurality of pulses.

Briefly, in accordance with the invention apparatus is provided for measuring distortion in a first train of pulses by sensing the start of the train and counting a second train of pulses generated by a pulse generator operating at a pulse repetition rate that is a multiple of the first train of pulses. Means sense the occurrence of the pulses in the first train to cause the pulse count to be converted to an analog quantity which indicates a measure of the distortion.

Figure 1:
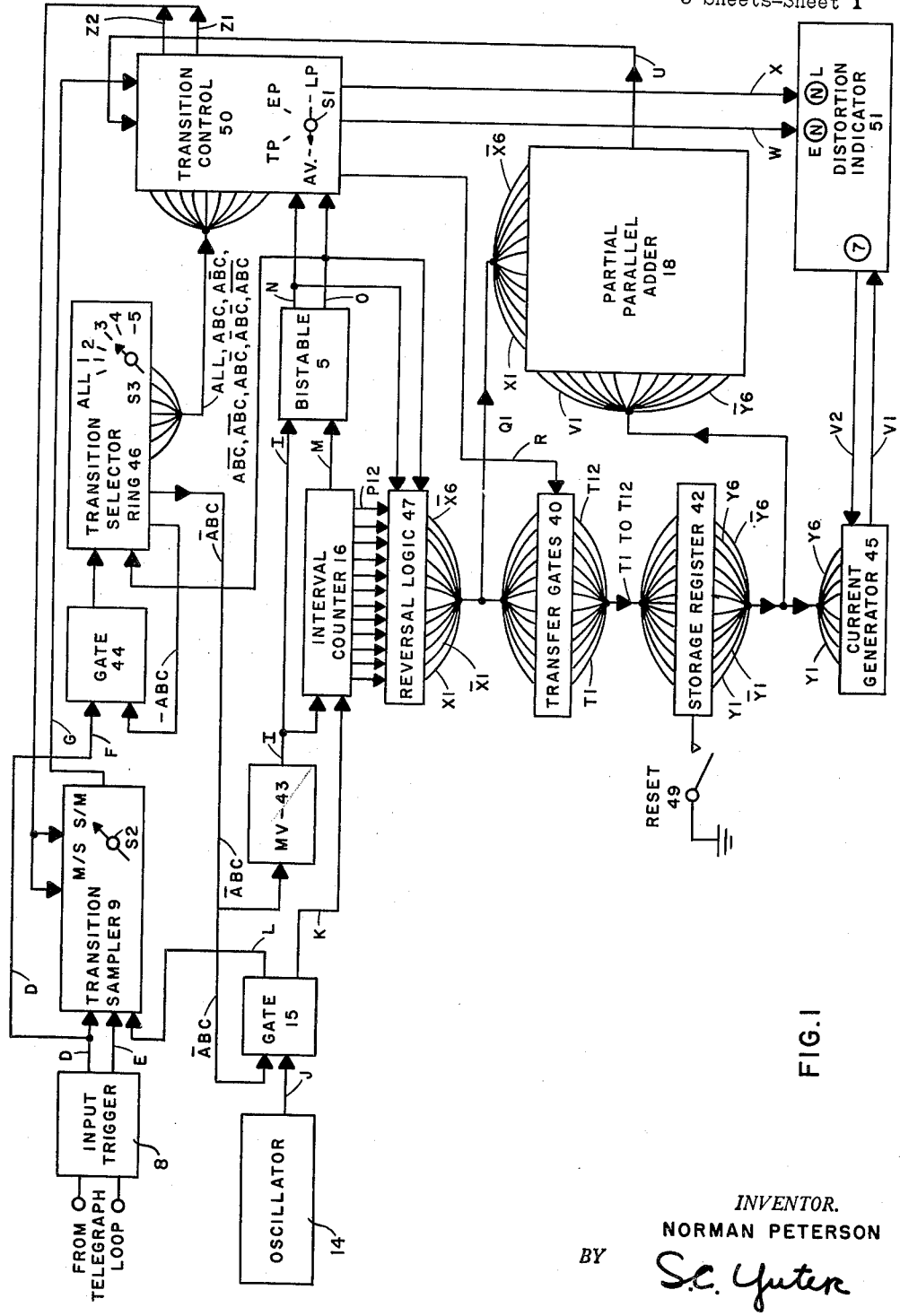

Other objects, features and advantages of the invention will be apparent from the following detailed description when read with the acocmpanying drawings wherein:

FIG. 1 is a block diagram of the invention; and FIGS. 2 to 5 are more detailed logical diagrams of the blocks of FIG. 1.

The distortion analyzer in accordance with the invention, shown in FIG. 1, gives an indication of the bias distortion in telegraph characters. Bias distortion is the deviation in the width of the bauds of a character from a standard width. In other words the transitions from mark to space or space to mark can occur earlier or later than a predetermined standard time. The distortion analyzer is capable of selectively analyzing either mark to space or space to mark distortion. It can measure this distortion for all transitions of a character or any selected transition. It further can measure such distortion in various ways called average distortion, total peak distortion, early peak distortion, or late peak distortion. Average distortion is the distortion integrated over many characters. Total peak distortion is the maximum deviation of any transition over a plurality of characters. Early peak distortion is the maximum early deviation of any transition. Late peak distortion is the maximum late deviation of any transition.

To accomplish these various analyses the distortion analyzer includes: input trigger 8 which shapes received telegraph bauds and transmits them as oppositively phase pulse trains; a transition sampler 9 which transmits a very short duration pulse for each mark to space or space to mark transition; an AND gate 44 which controls passage of signals from transition sampler 9 to transition ring selector 46 which generates signals indicating which baud of the character is being received at any given time; an oscillator 14 which transmits pulses having a repetition rate one hundred and twenty eight times the baud rate; an AND gate 15 which controls the transfer of the pulses from oscillator 14 to interval counter 16, a six-stage binary counter which is initially cleared by monostable multivibrator 43 at the start of the reception of a telegraph character; a bistable 5 which is a single-stage binary counter indicating whether an early group of sixty-four pulses or a late group of sixty-four pulses is being counted by interval counter 16; reversal logic 47 which is a plurality of substantially six pairs of AND gates 47, one AND gate of each pair is enabled depending on the state of bistable 5 to cause the signals representing the count in interval counter 16 or their inverse (the one's complement of the count) to be transferred; transfer gates 40 which are twelve AND gates which permit the timed transfer of the signals representing the count and their one's complement from reversal logic 47; a six bistable storage register 42 which temporarily stores the signals representing the count from transfer gate 49; reset switch 49 for clearing storage register 42; current generator 45 which changes the digital representation of the count in storage register 42 to an analog current; partial parallel adder 18 which receives the signals representing the count stored in storage register 42 and the instantaneous count being transferred by reversal logic 47 to give an inhibit signal when the latter count is smaller; transition control 50 which selects which transition is to be tested and enables transfer gates 49 when the transition being tested meets predetermined criteria; and distortion indicator 51 which includes a current meter and a pair of selectively energized neon lamps to give a measure of the degree of distortion and whether the distortion is late or early.

More particularly, the telegraph characters are received from a telegraph loop (not shown) by input trigger 8 which provides direct current isolation and transmits a replica of the bauds or their inverse via lines D and E respectively to transition sampler 9. Transition sampler 9 includes a switch S2, which permits the selection of either mark to space or space to mark transitions for analysis. In any event, the stop mark to start space transition at the start of a character passes through AND gate 44 to step transition selector ring counter 46 off its home position. When stepping off the home position, transition selector ring counter 46 transmits a signal via line $\overline{ABC}$ to monostable multivibrator 43 which clears interval counter 16 via line I to its maximum count (sixty-three) and enables AND gate 15 to pass pulses present on line J from oscillator 14 to interval counter 16 via line K. AND gate 15 also transmits these pulses via L to transition sampler 9 to activate a narrow pulse generator which thereafter transmits a sampling transition pulse for each succeeding mark to space or space to mark transition via line G to transition control 50. When interval counter 16 has counted 64 pulses it transmits a pulse via line M to bistable 5 which changes state, causing the transmission of a pulse via line O which steps transition selector ring 46 to the first baud. Interval counter 64 counts another sixty-four pulses. During this second count the voltage on lines N and O indicated the early portion of the interval. At the end of the second count interval counter 16 transmits a pulse via line M which changes the state of bistable 5 and interval counter 16 counts another sixty-four pulses. During the third count bistable 5 indicates the late portion of the interval. The counting proceeds in this manner with the termination of every odd count of 64 by interval counter 16 causing, through the agency of bistable 5, the stepping of transition selector ring 46 to a new baud. The potentials on lines N and O in addition to informing transition control 50 of the early or late condition also control the AND gates in reversal logic 47. Reversal logic 47 simultaneously receives via lines P1 to P12 signals representing the count and its complement from interval counter 16. During the early interval, signals representing the actual count in interval counter 16, are transferred via reversal logic 47 and via line Q1 to transfer gates 40 and partial parallel adder 18. During the late interval, reversal logic 47 in response to the change in polarities on lines N and O transmits the one's complement of the count in interval counter 16.

When the transition occurs and it is a transition which has been chosen for analysis the transition sampling pulse on line G passes through transition control 50 to line R causing a sampling of transfer gates 40 and the signals representing the count or its complement are transferred via lines T1 to T12 to storage register 42. Storage register 42 transmits the signal representing the stored count via lines Y1, Y2, Y3, Y4, Y5, and Y6 to current generator 45 which transmits a magnitude of current proportional to the count via lines V1 and V2 to current meter 7 in distortion indicator 51. At the same time, transition control 50 in response to the polarity of the voltages on lines N and O transmits a signal via either the line W or X to energize an early or late transition indicator lamp (N) in distortion indicator 51.

It should be recalled that after the first sixty-four pulses after the stop mark to start space transition bistable 5 changes state causing a pulse to be transmitted via line O, stepping transition selector ring 46 to its next state which is associated with the first baud of the character. Thereafter, each count of 128 pulses by interval causes bistable 5 to return to this state and on the transition back to this state a signal on line O causes transition selector ring 46 to step to the next baud position. Therefore, every one hundred and twenty-eight pulses from oscillator 14 after the first sixty-four pulses following the stop mark to start space transition, transition selector ring 46 steps to a new baud position. Finally, when the stop mark is to occur at the end of the character, transition selector ring 46 has stepped to its home position changing the polarity of the voltage on line $\overline{ABC}$ and transition sampler 9 is reprimed to await the stop mark to start space transition of the next character and gate 15 is blocked.

As has heretofore been stated different types of distortion can be analyzed. Switch S2 in transition sampler 9 permits the choice of analyzing mark to space or space to mark transitions. Switch S3 in transition selector ring 46 permits analyzing all transitions of all bauds or the transitions for unique bauds in the character. The signals on lines ALL, $\overline{ABC}$, $\overline{ABC}$, $\overline{ABC}$, $\overline{ABC}$, $\overline{ABC}$, $\overline{ABC}$, control which transition sampling pulse received from transition sampler 9 via line G shall pass through transition control 50 to line R and under certain conditions depending on the type of analysis being performed to lines W and X.

Switch S1 in transition control 50 permits analysis of average or peak distortion. During analysis of peak distortion, transition control 50 becomes dependent on partial parallel adder 18. In particular, partial parallel adder 18 only permits transition control 50 to pass a transition sampler pulse only when the count present in interval counter is greater than the count stored in storage register 42 during the occurrence of the transition. This means that the transition now being analyzed has a greater deviation from the norm than any previously sampled transition. If this be the case partial parallel adder 18 is generating a permission signal on line Y to allow transition control 50 to pass the sampling pulse via line R to transfer gate 40. The count in the interval counter 16 at that time replaces the count in storage register 42. During analysis for average distortion the circuits in transition control 50 are de-sensitized to the contracting effect of partial parallel adder 18.

Each of the several units of the distortion analyzer will now be described in greater detail.

Figure 2:
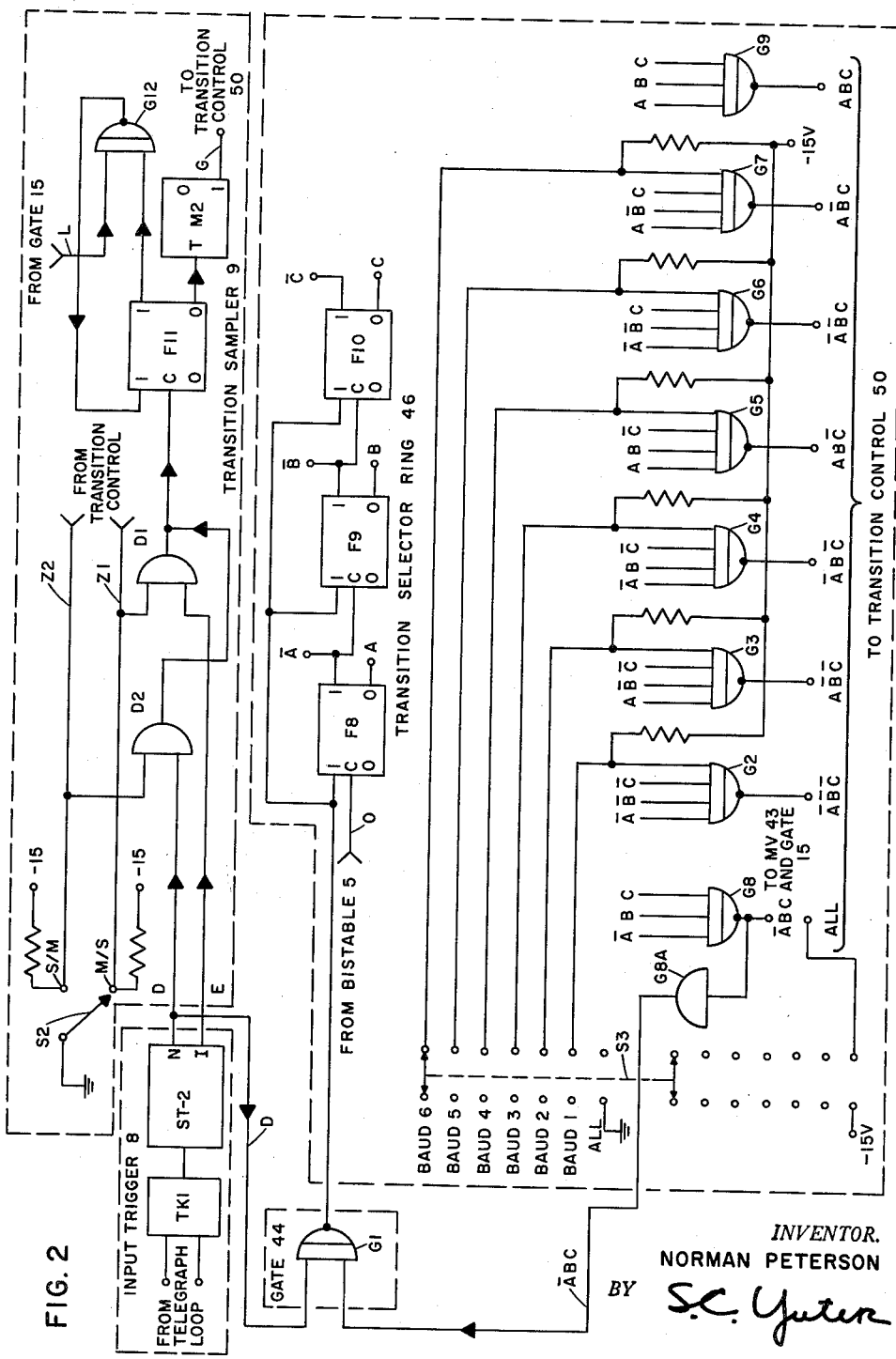
Figure 3:
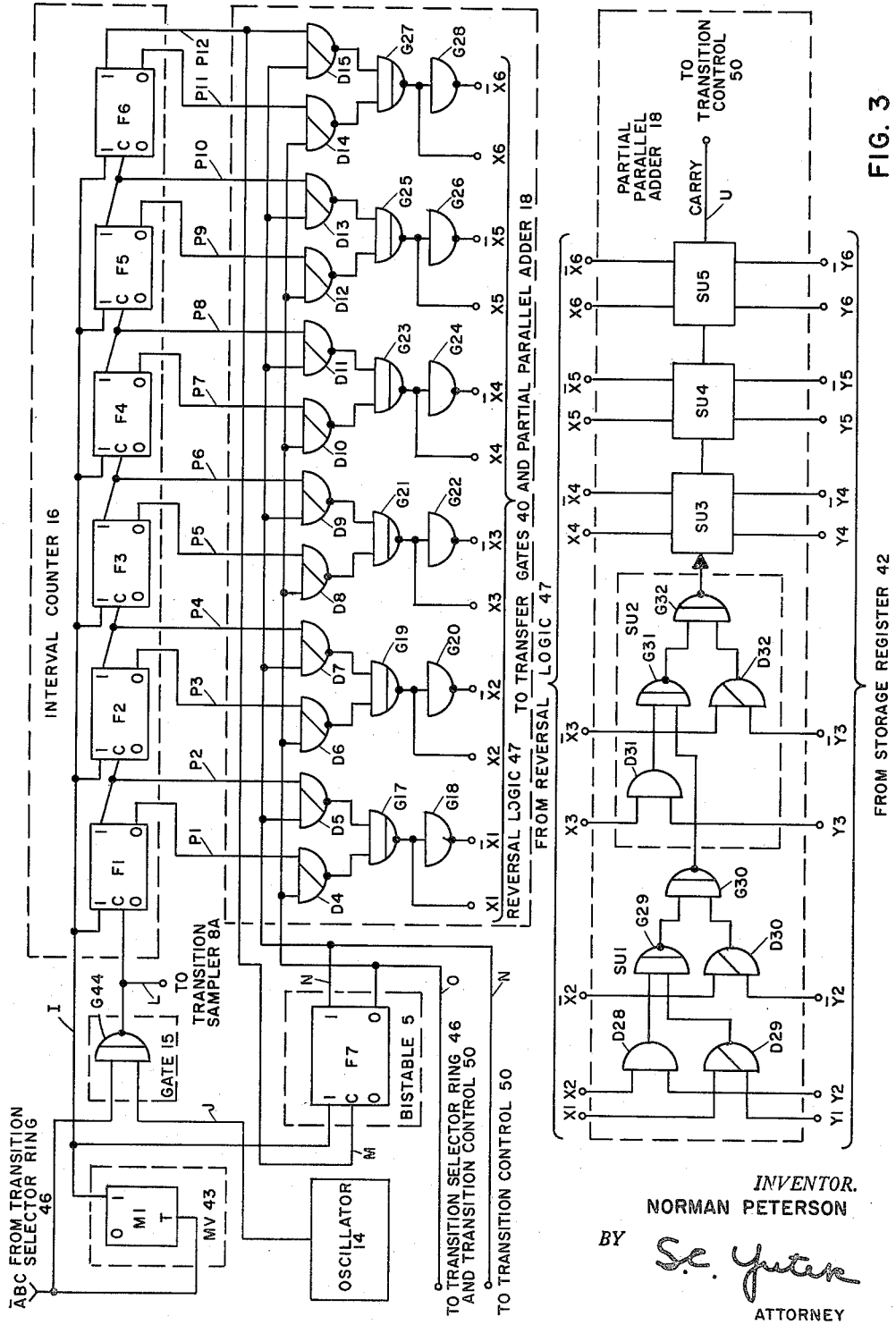

Input Trigger 8 is shown in FIG. 2 comprising a tone keyer TK1 which may be as shown in co-pending patent application Serial Number 702,418 filed on December 12, 1957. With neutral input signals, tone keyer TK1 may comprise an oscillator 10, a D.C. isolation transformer 12 and a rectifier filter 14 as shown in FIG. 3 of said copending application. With polar input signals, however, tone keyer TK1 requires two oscillators 10, two transformers 12, and two rectifier filters 14. These circuits are coupled together to form two oscillator-transformer-rectifier combinations as shown in said FIG. 3, but the oscillator 10 circuits are connected to the input in such a manner that one oscillator 10 is activated by the space signal current and the other oscillator 10 is activated by the mark signal current. The rectifier filters 14 of this circuit arrangement are adapted to produce output signals of opposite polarity, whereby a mark input current produces a positive output from one rectifier filter 14 and a space input current produces a negative output signal from the other rectifier filter 14. These two outputs are combined in a common output conductor of tone coupler TK–1 and are applied as a common input to trigger ST–1. Tone keyer TK1 essentially reproduces the signals received from the telegraph loop and applies them to trigger ST–2, a conventional Schmitt trigger which shapes the signals and transmits the shaped signals on line D and their inverse on line E.

Transistion sampler 9 selects either mark to space or space to mark transitions for sampling and generates a transition sampling pulse for each of these selected transitions. Space to mark transitions are sampled when switch S2 is in the S/M position or switch S3 in Transition Control 50 (FIG. 1) is in the total peak position. Mark to space transitions are sampled when switch S2 is in the M/S position or switch S3 in Transition Control 50 (FIG. 1) is in the total peak position. Switch S2's fixed contacts are respectively coupled to respective input terminals of positive AND gates D1 and D2, the other input terminals of which are respectively coupled to lines E and D. Positive AND gates D1 and D2 and all positive AND gates in the apparatus transmit a positive voltage from the output terminals when and only when both of their input terminals are at positive voltages. If either or both input terminals are at negative voltages the output is negative. Throughout the remainder of the specification, ground (zero volts) voltage is considered the positive voltage and −15 volts the negative voltage. Thus, if switch S2 is in the M/S position a negative to positive transient will be transmitted by positive AND gate D1 when a mark to space transition is received. Note that line E is connected to the inverted output of trigger ST–2. The output terminals of positive AND gates D1 and D2 are coupled to the zero input terminal of bistable F11. Bistable F11 and all bistables throughout the apparatus may be conventional bistable multivibrators which are triggered by positive going transients received at their zero, count, or "one" input terminals. A positive going transition received at a zero input terminal causes the generation of a negative voltage at the zero output terminal and a positive voltage at the one output terminal. A positive going transient received at the "one" input terminal causes the generation of a positive voltage at the zero output terminal and a negative voltage at the one output terminal. A positive transient at the C, or count, input terminal causes the bistable to change state with the polarities of the voltages at the output terminals interchanging. Thus, the positive going transients into the zero input terminal of bistable F11 causes a negative voltage at the zero input terminal.

With bistable F11 set in the zero state the one's output terminal is at a positive potential and therefore the associated input terminal of inverting AND gate G12 is at a positive potential. Inverting AND gate G12 and all inverting AND gates throughout the apparatus are of the NOR type wherein its output terminal is at a negative voltage when and only when all input terminals are at positive voltages. If either input terminal is at a negative potential the output terminal is at a positive potenial. At all times except during the stop mark time, pulses will be present on line L from gate 15. During the stop mark time, line L will be at a positive potential. The first pulse on line L causes inverting AND gate 12 to pass a positive going transient to the one input of bistable F11 which generates a positive voltage from its one output terminal and a negative voltage from its zero output terminal. The inverting AND gate G12 is blocked until the next transition is received by transition sampler 9. The transition from negative to positive voltage triggers monostable multivibrator M2, a well known circuit, which transmits a thirty microsecond positive pulse via line G to Transition Control 50. This positive pulse is the transition sampling pulse. In this manner each transition selected by switch S2 which is received from input trigger 8 is converted to a transition sampling pulse.

FIG. 2 also shows gate 44 and transition selector ring 46, which will be described together. Transition selector ring 46 is a baud timer which counts the bauds in a character and transmits a gate signal which enables transition control 50 for one half baud prior to, and one half baud after, the zero bias time position of the selected baud.

During the stop mark of the previous character, transition selector 46 is in its home position that is with bistables F8 in the one state and F9 and F10 in the zero state, line $\overline{ABC}$ has a negative voltage because inverting AND gate G8 is receiving three positive signals. The signal on line $\overline{ABC}$ is inverted by conventional inverter G8A whose output is coupled to one input of gate 44 which is inverting AND gate G1. When the stop mark and start space transition is transmitted from input trigger 8 via line D to gate 44 the output of inverting AND gate G1 goes from a negative to a positive voltage. This transition is received by the one input terminals of bistables F8, F9 and F10, and they are all set to their one state. The voltage on lines $\overline{ABC}$ to gate G8 goes positive and the voltage on line $\overline{ABC}$ goes negative blocking gate 44 (i.e., the output of gate 44 goes negative). One half baud period later, a pulse from bistable 5 steps bistables F8, F9, and F10 to the zero state. Note that this is one half baud before the first baud transition. Every baud period thereafter, a positive transition is received from bistable 5 via line O at the count input of bistable F8 causing the bistables to step by conventional binary counting action. Inverting AND gates G2 to G9 are successively potentially activatable subject to the conditions of switch S3. Thus each step of the transition selector ring 46 is one from a half baud before the transition to a half baud after. For example, if a transition associated with the first baud of a character is selected, S3 is put in the baud 1 position which applies a positive voltage at one input of inverting AND gate G2. When the bistables F8, F9, and F10 were reset to the one state by gate 44 which was activated by the stop mark to start space transition and after the first pulse from bistable 5 then stepped the bistables F8, F9, and F10 to the zero states first baud transition is coming up. The line $\overline{A}$, $\overline{B}$, $\overline{C}$ all have positive potentials at this time and inverting AND gate G2 transmits a negative voltage to transition control 50 to enable it. It should be noted that at this time inverting AND gates G3 to G9 are all transmitting positive voltages. For example the B signal line is at a negative potential and therefore the output of inverting AND gate G4 is blocked. A similar analysis of the remaining inverting AND gates will show a similar result. If the first baud had not been selected then switch S3 would be on some other position and although the potential on lines $\overline{A}$, $\overline{B}$, and $\overline{C}$ are positive the voltage on the fourth input to inverting AND gate G2 is negative and it transmits a positive voltage. If all transitions are to be analyzed then switch S3 is placed in the all position and a negative voltage is on the ALL signal line.

FIG. 3 shows interval counter 16 which is a six stage binary counter train, which counts pulses from oscillator 14 which is operating at one hundred twenty-eight times the baud rate. Interval counter 16 counts down from 64 pulses twice per baud. The first count starts a half a baud prior to the transition and ends when the transition should occur and the second count starts when the transition should occur and ends a half a baud later.

When transition selector ring 46 steps off its home position, as a result of the stop mark to start space transition, the signal on line $\overline{ABC}$ goes positive, triggering multivibrator MV43 a conventional monostable multivibrator M1 which clears bistables F1 to F6 to their zero state by applying a negative pulse to their one input terminals. The binary number 63 is set by the controls. The transition to a positive voltage on line $\overline{ABC}$ also enables gate 15 which is of the inverting type AND gate G44, allowing pulses to pass from oscillator 14 into the count input of bistable F1. When the sixty-fourth pulse has been counted the one output terminal of bistable F6 goes positive causing a positive transient to trigger bistable 5 which is a conventional bistable multivibrator F7. Bistable 5 transmits a positive going pulse to transition selector ring 46 to step it to the first baud position. This occurs one-half baud before the first transition should arrive. Interval counter 46 again counts 64 pulses and, when the count is reached, bistable 5 is again triggered causing a negative voltage to be fed via line O to transition selector ring 46. This pulse has no effect. The next count of sixty-four causes bistable 5 to change state again and to transmit a positive pulse to transition selector ring 46 stepping it to the baud number two state. This process continues to the stop mark when gate 44 is blocked.

Reversal logic 47 controls whether the count in the interval counter 16 or its one complement is to be transmitted. During the odd count of sixty-four, the count is transmitted; while during the even counts of sixty-four, the one's complement is transmitted. Reversal logic 47 is comprised of six pairs of negative AND gates D4 and D5, D6 and D7, D8 and D9, D10 and D11, D12 and D13, and D14 and D15. This non-inverting configuration is well known and has the property of transmitting a negative voltage from its output when and only when all its inputs are negative; at other times it transmits a positive voltage. A typical pair of non-inverting gates are D4 and D5. One input of AND gate D4 is coupled from the zero output terminal of bistable F1 while the other input is coupled from the zero output terminal of bistable F7. One input of non-inverting AND gate D5 is coupled to the one output terminal of bistable F1 and the other input terminal is coupled from the one output terminal of bistable F7. The output terminals of non-inverting AND gates D4 and D5 are coupled to input terminals of inverting AND gate G17. It should be noted that an inverting AND gate transmits a negative voltage from its output when both inputs are at positive voltages. However, when either input is at a negative voltage the output is at a positive voltage. Therefore, the inverting AND gate for positive signals can also operate as an inverting OR gate for negative input signals and an inverting AND gate for positive input signals. Inverting AND gate G17 is operating as an inverting OR gate. The output terminal of inverting AND gate G17 is used directly to transmit the X1 signal on the X1 signal line. The output of inverting AND gate G17 is fed to the input of inverting amplifier G18 which is a one input inverting AND gate whose output is coupled to the $\overline{X1}$ signal line. Inverting AND gates G19, G21, G23, G25, and G27 are similar to inverting AND gate G19 and operate in the same manner. Inverting amplifiers G20, G22, G24, G26, and G28 are similar to inverting amplifier G18 and operate in the same manner.

During the odd groups of 64 pulses from the interval counter 16, negative AND gates D5, D6, D7, D9, D11, D13, and D15 are enabled by the signal from zero output of bistable 5 and the count in the interval counter 16 is transmitted along the lines X1, X2, X3, X4, X5, and X6, and the inverse of this count is transmitted along $\overline{X1}$, $\overline{X2}$, $\overline{X3}$, $\overline{X4}$, $\overline{X5}$, and $\overline{X6}$ signal lines. During even counts of 64 pulses negative AND gates D4, D6, D8, D10, D12, and D14 are enabled by the signal from the one output of bistable 5 and by the interval counter 16, the complement of the count is transmitted along X1, to X6 signal lines and the inverse of the count is transmitted along the $\overline{X1}$ to $\overline{X6}$ signal lines. In this manner, the absolute value of the time position difference of a transition from the ideal transition time position is obtained whether the transition occurs early or late. Bistable 5 remembers whether the transition is early or late. Thus the distortion can be indicated as an absolute value of magnitude plus a sign related to earliness or lateness.

FIGURE 4 shows transfer gates 40 which controls the transfer of the count or its complement from reversal logic 47 to storage register 42 which is comprised of positive AND gates D16 to D27. It will be recalled that this positive AND gate configuration transmits a positive voltage when and only when all inputs are positive. One input of each of the positive AND gates D16 to D27 is coupled to line R from transition control 50 which generates a positive pulse when the selected transition occurs to cause the transfer of the counter from reversal logic 47 to storage register 42. The other inputs of each of the positive AND gates D16 to D27 is coupled to one of the lines $\overline{X1}$ to $\overline{X6}$ and X1 to X6. The outputs of positive AND gates D16 to D27 are coupled to the lines T1 to T12. A typical positive AND gate 16 operates as follows: when a positive going pulse is on line R a positive going pulse will be transmitted to line T1 if line X1 is at a positive voltage; however, if line X1 is at a negative voltage then line T1 will be at a negative voltage and no positive going pulse is transmitted on line T1. The positive AND gates D17 to D27 operate in the same manner.

Storage Register 42 (FIG. 4) which stores the count received from transfer gates 40 comprises the six bistables F12 to F17. A typical bistable F12 has its zero input coupled via line T1 to the output of positive AND gate D16 and has its one input coupled via line T2 to the output of positive AND gate D17. Therefore if the voltage on line X1 is positive ($\overline{X1}$ being the inverse, is accordingly negative) when the positive going pulse is present on line R bistable F12 will be set to its zero state. If the voltage on line $\overline{X1}$ is positive, however (the X1 line being at a negative voltage), bistable F12 will be set to the zero state. Bistables F13 to F17 operate similarly. In this manner, storage register 42 stores the count to which the interval counter is set at the time the input transition arrives. A digital indication of the stored count is manifested by the voltages present on the lines Y1, $\overline{Y1}$, to Y6 and $\overline{Y6}$.

Current generator 45 in FIGURE 4 converts the digital count stored in storage register 42 to an analog current which is transmitted via lines V1 and V2 to a current meter in distortion indicator 51. Current generator 45 includes constant current generators CG1 to CG6 respectively coupled to lines Y1 to Y6. A typical constant current generator CG6 is shown comprising transition TR1 having: a base is coupled to line Y6, an emitter coupled via resistor R1 to a negative voltage, and a collector coupled via resistor R2 to the bus line BUS. A positive voltage on line Y6 causes a fixed current to flow through transistor TR1. The magnitude of the current is predetermined by the magnitudes of resistors R1 and R2. The resistors R1 and R2 are chosen such that the current flowing through constant current generator CG6 is one-half that which can flow through constant current generator CG5, which is one-half that which can flow through constant current generator CG4, etc. The current flow on line BUS is effectively summed in transistor TR2 and fed via lines V1 and V2 to the current meter M which is distortion indicator 51. Thus for each count stored in storage register 42 a unique current is generated by current generator 45 and transferred to distortion indicato 51.

Returning to FIGURE 3 partial parallel adder 18 will now be described. The partial parallel adder is magnitude comparator which compares the number stored in the storage register 42 represented by the signals on lines Y1 to $\overline{Y6}$, with the count in the interval counter 16 represented by the signals on lines X1 to $\overline{X6}$ to produce a positive going pulse on line U when the count in the interval counter 16 is less than the number stored in storage register 42.

The partial adder theory utilizes the fact that when a binary number X is added to the complement of another binary number Y, a "carry" signal is obtained if X is larger than Y. For example, assume a counter is counting from one to ten and it is desired to provide an output when the counter number is larger than another number stored in a register (assume this number to be 5). When the counter number is smaller than the register number, the addition of the counter number and the complement of the register number does not produce a carry. For example, if the counter number is 100(4), the sum of 100 plus 010 (the complement of 101 or five) equals 110 and no carry. When the counter number exceeds five, however, a carry signal is generated by the addition of the numbers. For example, when the counter number is 110(6), the sum of 110 plus 010 (the complement of five) equals 000 and a carry 1.

Partial parallel adder 18 comprises summing units SU1 to SU5. A typical summing unit SU2 will now be described. A carry is indicated by a positive going pulse transmitted by a summing unit to the next summing unit to generate a carry one of the following conditions must be present:

(1) If a carry is received from the previous stage either the voltage on line X3 or Y3 must be positive.

(2) If a carry is not received from the previous stage then both X3 and Y3 must be present.

The first condition is performed by inverting AND gate G31 and negative OR gate D31 acting as a positive AND gate. It should be noted that a negative AND gate transmits a negative out when and only when both of its inputs are negative. However when either input is positive it transmits a positive output or acts like a positive OR gate. If a carry is present from previous summing unit SU1 then the input terminal of inverting AND gate G31 connected to the output terminal of inverting AND gate G30 is positive and if either the voltage on line X3 or line Y3 is positive the output of negative AND gate D31 is positive therefore both inputs to inverting AND gate G31 are positive and its output is negative. Since the output of inverting AND gate G31 is coupled to one input of inverting AND gate G32, the output of inverting AND gate G32 will be positive regardless of the voltage on its other input. For second case if voltages on lines X3 and Y3 are both positive the voltages on lines $\overline{X3}$ and $\overline{Y3}$ are necessarily negative therefore the output of negative AND gate D32 is negative. Since the output of negative AND gate D32 is coupled to an input of inverting AND gate G32, the output of inverting AND gate G32 is positive regardless of the voltage present on its other input. The remaining summing units work in a similar manner.

FIGURE 5 shows the transition control 50. When a transition sampling positive going pulse is received from transition sampler 9 via line D it is fed to an input G13—1 of inverting AND gate G13 which will transmit a negative going pulse provided all other input terminals are at positive potentials. The voltages on these terminals control whether the transition is to be registered. The ABC line from transition selector ring 46 is at a negative voltage only during the stop mark to start space transition period and prevents the unwanted registering of a transition at that time. At all other times, the input G13—2 is at a positive potential. The input terminal G13—3 is coupled to the output terminal of inverting AND gate G11 which controls registering the transition only for the selected baud of the character. If all baud transitions are to be sampled the voltage on the line ALL is negative and the output of inverting AND gate G11 will be positive for all bauds. Otherwise, the output of inverting AND gate G11 will be at a positive voltage only when one of the remaining inputs is negative. Each input is connected to a line from the transition selector ring 46 and only one of these lines will have a negative voltage during the entire character receiving time that line being the one associated with the selected baud as previously described.

If early peak distortion is being analyzed switch S1 is in the early peak position applying a positive voltage to one input of inverting AND gate G16 whose output which is coupled to input G13—5 will go positive when a negative voltage is received via line O from bistable 5 indicating that the early portion of the count is being made by interval counter 16. Similarly if switch S2 is in the late peak position a positive voltage is applied to one input of inverting AND gate G15 whose output which is coupled to input G13—4 goes positive when a negative voltage is received via line N from bistable 5 indicating that the late portion of the count is in progress. If early peak distortion is being analyzed switch S1 is in the early peak position applying a positive voltage to one input of inverting AND gate G16 whose output which is coupled to input G13—5 will go positive when a negative voltage is received via line O from bistable 5 indicating that the early portion of the count is being made by interval counter 16. Similarly if switch S2 is in the late peak position a positive voltage is applied to one input of inverting AND gate G15 whose output which is coupled to input G13—4 goes positive when a negative voltage is received via line N from bistable 5 indicating that the late portion of the count is in progress. If average distortion is being analyzed switch S1 is in the average position and one input of inverting AND gate G39 is at a negative voltage and its output is therefore positive. However, if any type of peak distortion is being analyzed this input is at a positive potential and the output of inverting AND gate G39 will only go positive when the input coupled to line U from the partial parallel adder is at a negative potential. This will occur when the count in the interval counter 16 is greater than the number stored in storage register 42.

When inverting AND gate 13 does transmit a negative pulse it is inverted by inverting amplifier G14 which transmits via line R a positive going pulse to open transfer gates 40 so that a new count can be stored. The positive going pulse is also transmitted to positive AND gates D39 and D40. If the interval counter 16 is in the early portion of the count as indicated by bistable 5 the pulse passes through positive AND gate D39 setting bistable F18 to the zero state. If the interval counter 16 is in the late portion of the count, the pulse passes through positive AND gate D40 setting bistable F18 to the one state. When bistable F18 is in the one state its zero output is positive and if switch S1 is in the average position, a negative voltage is transmitted from inverting AND gate G40 via line X to fire the late neon in distortion indicator 51. The early lamp is off due to gate G41 providing a positive (ground) output. Similarly, if the bistable F18 is in the zero state its one output is positive and if switch S1 is in the average position, a negative voltage from inverting AND gate G41 is transmitted on line W and the early neon is ignited and the late lamp is turned off by the positive (ground) output of G40. If switch S1 is in any of the peak positions, the negative voltage from the switch causes the output of both G40 and G41 to be positive (ground) and both the early and the lamp is turned off.

*Appendix*

The inverting add gates may be similar to those shown in "The Transistor NOR Circuit" article start at p. 231, of Wescon 1947 Convention Record, part 4. The positive AND gates may be similar to those shown in FIG. 3 of U.S. Patent 2,835,807 Timing Device. The negative AND gates may be similar to those shown in FIG. 4 of the above patent. Of course, it should be noted that different voltage levels may be employed. It should further be noted that many other variations of these logical elements are available and may be equally applicable provided they satisfy the same logical conditions.

What is claimed is:

1. A system for monitoring divergence of communications signals from a predetermined reference level, comprising in combination, timing means providing timing outputs for timing occurrence of said signals, gating means for passing selected groups of said signals as timed by series of said timing outputs, counting means for dividing said series into chosen timing patterns, means for producing number-output corresponding to said reference level, and adding means for continuously subtracting said number-output from said patterns synchronously with the production thereof.

2. A system for comparing quality of communications signals with a selected quality standard, comprising in combination, timing means providing timing pulses for timing said signals, gating means for passing selected groups of said signals as timed by predetermined series of said pulses, counting means for dividing said series into chosen sub-intervals, means for producing a number equivalent from said sub-intervals, means for resetting said counting means to operate consecutively for successive ones of said groups, and means for registering divergences of said signals for said standard.

3. Apparatus for monitoring distortion of signal input with respect to a predetermined reference level, said input being communicated in the form of intelligence bits, comprising oscillator means sending pulses to gating means, said gating means supplying selected groups of said pulses to digital counter means in accordance with said input, generator means providing distortion reference output, adder means performing continuous subtraction of said reference output from said groups of pulses in synchronism with successive changes in the forms of said bits, said adder means actuating display means successively in accordance with the successive occurrences of distortion in said input.

4. A communications distortion monitor in which elements of input signals are distributed by synchronization means to gating means, digital counting means, and bistable means, said gating means feeding the output of pulse generating means to said counting means in accordance with transitions in the form of said signals, said counting means feeding its output to adder means and said bistable means, second generating means being provided to feed a reference signal to said adder means under control of said bistable means, said adder means performing continuous subtraction of said reference signal from the output of said counting means and itself producing output to display means for indication of successive occurrences of distortion in said input signals.

5. A distortion monitor in which elements of input signals are distributed to gating, counting, and bistable means, said gating feeding pulses from a first generator to said counting means, said counting means being connected to adder and bistable means, a second generator feeding reference signals to said adder means in synchronism with said bistable means, said adder means subtracting said reference signals from digitally divided output of said counting means, the output of said adder being fed to display means for indication of successive occurrences of distortion in said input signals with respect to said reference signals.

6. Testing equipment for indicating the presence of distortion in signal input communicated in chosen time intervals, comprising triggering means for passing portions of said input to a signal gate and through a first OR-circuit to a first bistable device, said signal gate feeding a second bistable device and a pulse gate, said pulse gate sending pluralities of pulses from a pulse generator to a sub-interval counter and a first AND-circuit in accordance with said time intervals, said second bistable device being also fed with output of a second OR-circuit, said sub-interval counter sending digitally divided output to a subtracting circuit and a third bistable device in accordance with successive pluralities of said pulses, said first bistable device also feeding said first AND-circuit, said first AND-circuit sending output to said first bistable device, a second AND-circuit and a third AND-circuit, said third bistable device feeding said second and third AND-circuits and a threshold generator, said threshold generator sending a distortion reference signal to said subtracting circuit, said subtracting circuit continuously subtracting said reference signal from said digitally divided output, said subtracting circuit feeding said second AND-circuit and through an inverter to said third AND-circuit, the output of said second and third AND-circuits actuating a display device through said second OR-circuit for indication of successive occurrences of distortion in said time intervals with respect to said reference signal.

7. Distortion testing apparatus comprising means for passing portions of signal input to a first bistable device, a digital counter and a pulse gate, said pulse gate sending pluralities of pulses from a pulse generator to said counter and a first AND-circuit in accordance with time intervals of said signal input, said counter sending digitally divided output to a subtracting circuit and a second bistable device in accordance with successive pluralities of said pulses, said first bistable device also feeding said first AND-circuit, said first AND-circuit sending output to said first bistable device, a second AND-circuit and a third AND-circuit, said second bistable device feeding said second and third AND-circuits and a threshold generator, said subtracting circuit subtracting from said digitally divided output a distortion reference signal obtained from said threshold generator, said subtracting circuit feeding said second AND-circuit and through an inverter to said third AND-circuit, the outputs of said second and third AND-circuits actuating display means through said OR-circuit for indication of successive occurrences of distortion in said signal input.

8. Distortion testing apaparatus as in claim 2, comprising a third bistable device, an OR-circuit and a signal gate, said signal input being fed into said signal gate and through said OR-circuit to said first bistable device, said signal gate feeding into said counter, said first OR-circuit feeding its output into said third bistable device, the output of said third bistable device being sent to said first AND-circuit to enable passage of output therefrom only for selected time intervals of signal input passed by said signal gate.

9. Telegraph test equipment comprising means for passing loop input to a signal gate and a synchronization circuit, said signal gate actuating a recycling circuit and a pulse gate, said pulse gate controlling output of a pulse generator to a waveform interval counter and a first coincidence circuit according to transitions in the waveform of said loop input, said recycling circuit also being fed with output of a distortion display circuit, said interval counter sending digitally divided output to a subtracting circuit and a half-waveform circuit in synchronism with and corresponding to said pulses, said recycling circuit also actuating said coincidence circuit, said coincidence circuit sending output to said recycling circuit, a second coincidence circuit and a third coincidence circuit, said half-waveform circuit feeding output marking time intervals of successive halves of the elements of said waveform to said second and third coincidence circuits and a reference number generator, said reference generator subtracting said reference number from said digitally divided output, said subtracting circuit feeding said second coincidence circuit and through an inverter to said third coincidence circuit, the output of said second and third coincidence circuits actuating said distortion display circuit successively in accordance with the occurrence of distortion in said transitions.

10. Telegraph test equipment comprising means for passing signal input to a signal gate and synchronization means, said synchronization means feeding a coincidence circuit, said signal gate feeding recycling means and pulse generating means, said pulse generating means gating pulses to counting means and said coincidence circuit according to transitions in the waveform of said input, said counting means sending digitally divided output to a subtracting circuit and a half-waveform gating device according to successive gatings of said pulses, said coincidence circuit sending its output to said synchronization means, a second coincidence circuit and third coincidence circuit, said gating device feeding said second and third coincidence circuits and a distortion number generator, said subtracting circuit subtracting from said digitally divided output a distortion number obtained from said number generator, said subtracting circuit feeding said second coincidence circuit and through an inverter to said third coincidence circuit, the outputs of said second and third coincidence circuits actuating display means successively according to successive occurrences of distortion in said transitions with respect to said number.

11. Telegraph test equipment according to claim 5, comprising recycling means, an input alternation circuit and a character gate, said input being fed to said character gate and through said alternation circuit to said synchronization means, said character gate controlling output of said pulse gate ot said counter according to transmitted separation of said input into telegraphic characters, said alternation circuit feeding said half-waveform gating device, the output of said gating device enabling passage of output from said coincidence circuit only for selected transitions in signal input passed by said character gate.

12. A communications distortion meter comprising an input trigger feeding elements of communications signal input to a synchronizing gate and by means of a display device to transfer gates and a storage register for enabling storage therein of successive distortion numbers, a signal selection gate being fed by said synchronizing gate and an interval selector, said interval selector gating output from a distortion interval counter to said selection gate, interval reversing means, and said transfer gates respectively, a signal alternator controlling output of said counter and said interval selector in accordance with changes in steady state conditions of said input, said signal selector feeding said display device, said synchronizing gate, said signal alternator and pulse gate respectively, said pulse gate gating pulses to said counter from a pulse generator under control of said alternator in accordance with transitions in the form of said input, said counter sending output digitally divided into intervals corresponding to pluralities of said pulses to said interval selector and said reversing means, the successive outputs of said storage register corresponding respectively to digitally divided number measurements of distortion in said transitions and being transferred out of said register to said display device under control of said transfer gates.

13. A communications distortion meter comprising an input trigger feeding elements of communications signal input to a synchronizing gate and by means of a display device to transfer gates and a storage register for enabling storage therein of successive distortion numbers, a signal selection gate being fed by said synchronizing gate and an interval selector, said interval selector gating output from a distortion interval counter to said selection gate, interval reversing means, and said transfer gates respectively, a signal alternator controlling output of said counter and said interval selector in accordance with changes in steady state conditions of said input, said signal selector feeding said display device, said synchronizing gate, said signal alternator and pulse gate respectively, said pulse gate gating pulses to said counter from a pulse generator under control of said alternator in accordance with transitions in the form of said input, said counter sending output digitally divided into intervals corresponding to pluralities of said pulses to said interval selector and said reversing means, the successive outputs of said storage register corresponding respectively to digitally divided number measurements of distortion in said transitions and being transferred out of said register to said display device under control of said transfer gates, said successive outputs being fed to an output averaging device to provide continuous averages of said successive outputs to said display device.

14. A communications distortion meter comprising an input trigger feeding elements of communications signal input to a synchronizing gate and by means of a display device to transfer gates and a storage register for enabling storage therein of successive distortion numbers, a signal selection gate being fed by said synchronizing gate and an interval selector, said interval selector gating output from a distortion interval counter to said selection gate, interval reversing means, and said transfer gates respectively, a signal alternator controlling output of said counter and said interval selector in accordance with changes in steady state conditions of said input, said signal selector feeding said display device, said synchronizing gate, said signal alternator and pulse gate respectively, said pulse gate gating pulses to said counter from a pulse generator under control of said alternator in accordance with transitions in the form of said input, said counter sending output digitally divided into intervals corresponding to pluralities of said pulses to said interval selector and said reversing means, the successive outputs of said storage register corresponding respectively to digitally divided number measurements of distortion in said transitions and being transferred out of said register to said display device under control of said transfer gates, said successive outputs being fed to a subtracting circuit, said subtracting circuit continuously comparing each successive individual output of said register with the next preceding output stored in said register, said individual output being stored in said register under the control of said transfer gates only when said individual output is greater than said preceding output.

15. A communications distortion meter comprising an input trigger feeding elements of communications signal input to a synchronizing gate and by means of a display device to transfer gates and a storage register for enabling storage therein of successive distortion numbers, a signal selection gate being fed by said synchronizing gate and an interval selector, said interval selector gating output from a distortion interval counter to said selection gate, interval reversing means, and said transfer gates respectively, a signal alternator controlling output of said counter and said interval selector in accordance with changes in steady state conditions of said input, said signal selector feeding said display device, said synchronizing gate, said signal alternator and a pulse gate respectively, said pulse gate gating pulses to said counter from a pulse generator under control of said alternator in accordance with transitions in the form of said input, said counter sending output digitally divided into intervals corresponding to pluralities of said pulses to said interval selector and said reversing means, the successive outputs of said storage register corresponding respectively to digitally divided number measurements of distortion in said transitions and being transferred out of said register to said display device under control of said transfer gates, said successive outputs being fed to a subtracting circuit, said subtracting circuit continuously comparing each successive individual output of said register with the next preceding output stored in said register, said individual output being stored in said register under the control of said transfer gates only when said individual output is greater than said preceding output, reset means being provided to erase any number stored instantaneously in said register, the instantaneous output of said display device indicating the peak distortion measurement obtained since said reset means was last actuated.

16. Telegraph distortion testing apparatus in which loop signal input is fed to synchronizing means, transfer gates, and a storage register, respectively, comprising an interval selector for gating output from a distortion interval counting circuit to display means, synchronization means, interval reversal circuits and transfer gates respectively, a pulse gate being provided to gate pulses from a pulse generator to said counting circuit under control of said synchronization means in accordance with transitions in the waveform of said input, said counter sending output digitally divided into intervals corresponding to pluralities of said pulses to said interval selector and said reversal circuits, successive outputs of said register corresponding respectively to digitally divided measurements of distortion in said transitions and being transferred to said display means under control of said transfer gates.

17. Telegraph distortion testing apparatus in which loop signal input is fed to synchronizing means, transfer gates, and a storage register, respectively, comprising an interval selector for gating output from a distortion interval counting circuit to display means, synchronization means, interval reversal circuits and transfer gates respectively, a pulse gate being provided to gate pulses from a pulse generator to said counting circuit under control of said synchronization means in accordance with transitions in the waveform of said input, said counter sending output digitally divided into intervals corresponding to pluralities of said pulses to said interval selector and said reversal circuits, successive outputs of said register corresponding respectively to digitally divided measurements of distortion in said transitions and being transferred to said display means under control of said transfer gates, said display means averaging said successive outputs.

18. Telegraph distortion testing apparatus in which loop signal input is fed to synchronizing means, transfer gates, and storage register, respectively, comprising an interval selector for gating output from a distortion interval counting circuit to display means, synchronization means, interval reversal circuits and transfer gates respectively, a pulse gate being provided to gate pulses from a pulse generator to avoid counting circuit under control of said synchronization in accordance with transitions in the waveform of said input, said counter sending output digitally divided into intervals corresponding to pluralities of said interval selector and said reversal circuits, successive outputs of said register corresponding respectively to digitally divided measurements of distortion in said transitions and being transferred to said display means under control of said transfer gates, each individual successive output being compared in a subtracting circuit with the next preceding successive output, said individual successive output being stored for selective readout from said register only when said individual successive output is greater than said preceding successive output.

19. Telegraph distortion testing apparatus in which loop signal input is fed to synchronizing means, transfer gates, and a storage register respectively, comprising an interval selector for gating output from a distortion interval counting circuit to display means, synchronization means, interval reversal circuits and transfer gates respectively, a pulse gate being provided to gate pulses from a pulse generator to said counting circuit under control of said synchronization means in accordance with transitions in the waveform of said input, said counter sending output digitally divided into intervals corresponding to pluralities of said pulses to said interval selector and said reversal circuits, successive outputs of said register corresponding repectively to digitally divided measurements of distortion in said transitions and being transferred to said display means under control of said transfer gates, means being provided to enable erasure of any distortion number stored in said register, instantaneous output of said register subsequent to said erasure corresponding to measurement to peak-distortion since said erasure.

20. Pulse distortion testing apparatus comprising first means for sensing the start of a group of pulses, pulse generating means operating at a multiple of the frequency of the pulses being tested, means under the control of said first sensing means for counting the pulses from said pulse generating means, second means for sensing the occurrence of the received pulses, storage means, means responsive to said second sensing means for transferring the count in said counting means to said storage means, and digital to analog converting means responsive to said storage means for converting said count to an analog quantity to indicate the distortion in the received pulses.

21. The apparatus of claim 20 including means for selecting a predetermined one of said received pulses to activate said sensing means.

22. The apparatus of claim 20 including means responsive to said storage means and said counting means to cause the transfer of the count in said counting means to said storage means only when the count in said counting means is greater than the count in said storage means.

23. Apparatus for measuring the distortion in the transitions between spaces and marks of the bauds representing telegraph characters comprising first means for sensing the start of a telegraph character, pulse generating means having a frequency that is a multiple of the frequency of the telegraph characters, pulse counting means for counting pulses from said pulse generating means, storage means for storing the count being accumulated in said counting means, control means for sensing said transitions to cause the transfer of the count being accumulated in said pulse counting means to said storage means, and means for converting the count stored in said storage means to an analog electrical quantity which indicates the distortion in said bauds.

24. The apparatus of claim 23 including means for selecting a baud in a character to activate said control means only when said selected baud is being received.

25. The apparatus of claim 24 including baud counting means and means for selecting a particular baud count to energize said control means.

26. The apparatus of claim 23 wherein said pulse generating means has a repetition rate of $n$ and said pulse counting means passes through two complete cycles for for each $n$ pulses of said pulse generating means, bistable means responsive to said counting means for being in a first stable state during the first cycle and the second stable state during the second cycle of said pulse counting means to indicate whether a transition occurs early or later with respect to an undistorted transition.

27. The apparatus of claim 26 including baud counting means responsive to said bistable means to record a count each time said bistable means changes from a first stable state to a second stable state wherein a count in said baud counting means indicates a different baud of the character is available for transition sampling.

28. The apparatus of claim 27 including means for selecting a particular baud count to activate said control means.

29. The apparatus of claim 23 including means for comparing the count in said pulse counting means and the count in said storage means to activate said control means only when the count in said counting means is greater than the count in said storage means when a transition occurs.

No references cited.